US012330470B1

(12) United States Patent
Lee

(10) Patent No.: US 12,330,470 B1
(45) Date of Patent: Jun. 17, 2025

(54) SUSPENSION FOR VEHICLE AND VEHICLE INCLUDING SAME

(71) Applicants: HYUNDAI MOTOR COMPANY, Seoul (KR); Kia Corporation, Seoul (KR)

(72) Inventor: Hyun Jae Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/922,759

(22) Filed: Oct. 22, 2024

(30) Foreign Application Priority Data

Dec. 13, 2023 (KR) ........................ 10-2023-0181277

(51) Int. Cl.
*B60G 7/00* (2006.01)
*B60G 21/05* (2006.01)

(52) U.S. Cl.
CPC ........... *B60G 7/001* (2013.01); *B60G 21/051* (2013.01); *B60G 2200/21* (2013.01); *B60G 2202/114* (2013.01); *B60G 2204/4104* (2013.01); *B60G 2204/416* (2013.01); *B60G 2204/422* (2013.01)

(58) Field of Classification Search
CPC .. B60G 7/001; B60G 21/051; B60G 2200/21; B60G 2200/114; B60G 2202/11; B60G 2204/422; B60G 2204/4104
See application file for complete search history.

(56) References Cited

FOREIGN PATENT DOCUMENTS

| | | | | | |
|---|---|---|---|---|---|
| DE | 102008049761 | A1 * | 4/2010 | ............. | B60G 11/08 |
| DE | 102013210338 | A1 * | 12/2014 | ............. | B60G 11/02 |
| JP | 2007045275 | A * | 2/2007 | | |

* cited by examiner

*Primary Examiner* — Faye M Fleming
(74) *Attorney, Agent, or Firm* — Fish & Richardson P.C.

(57) ABSTRACT

A suspension for a vehicle includes an arm including an arm body, a transverse leaf spring including a fixed leaf end and a free leaf end, and a link connecting the arm and the transverse leaf spring. The link includes a first link end connected to the arm body and configured to rotate relative to the arm body, where a rotation center of the first link end is located at the arm body, a second link end connected to the free leaf end and configured to rotate relative to the arm, and a link body that extends between the first link end and the second link end, the link body being spaced apart from the arm body.

11 Claims, 10 Drawing Sheets

10
120
Xa
130
310
A
700
330
110
X1
320
600
220
X2
420 410
400
230
210
UP
FRONT
RIGHT
LEFT
REAR
DOWN
110
120 } 100
130
210
220 } 200
230
310
320 } 300
330

SUSPENSION FOR VEHICLE AND VEHICLE INCLUDING SAME

CROSS-REFERENCE TO RELATED APPLICATION

This application claims the benefit of priority to Korean Patent Application No. 10-2023-0181277, filed in the Korean Intellectual Property Office, on Dec. 13, 2023, the entire contents of which are incorporated herein by reference.

TECHNICAL FIELD

The present disclosure relates to a suspension for a vehicle and a vehicle including the same.

BACKGROUND

A suspension may be applied to a vehicle and installed between a vehicle body and wheels to absorb vibrations generated while the vehicle is driven, and the suspension may prevent vibrations from being transmitted to a driver through the vehicle body.

For example, the suspension may include an arm that connects the vehicle body and wheels, a shock absorber, and the like. An impact absorbing device may include a spring and a shock absorber. The spring provided in the impact absorbing device is mainly provided as a coil spring that is installed in an upward/downward direction.

In some cases, where the spring provided in the suspension of the vehicle is a coil spring, an upper end of the coil spring may be installed to support a lower portion of the vehicle body. In some cases, where the upper end of the coil spring is installed to support a lower portion of the vehicle body, the height of the floor of the vehicle body may not be designed to be lowered below a certain height due to an upward/downward width of the coil spring itself.

SUMMARY

The present disclosure describes a suspension for a vehicle that has a structure that allows a height of a floor of the vehicle body to be lowered without being limited by springs.

According to an aspect of the present disclosure, a suspension for a vehicle includes an arm that is revolved about an arm rotation axis, and including an arm body extending in a forward/rearward direction, a transverse leaf spring including a fixed leaf end, of which a relative position to the arm rotation axis is fixed, and a free leaf end that is moved in a direction crossing the arm rotation axis with respect to the fixed leaf end, and a link connecting the arm and the transverse leaf spring, the link includes a first link end connected to the arm to be rotatable, a second link end connected to the free leaf end to be rotatable, and a link body extending between the first link end and the second link end, when one side of the link in an upward/downward direction is viewed in a direction being parallel to the upward/downward direction, a center of the first link end is located in the arm body, and the link body is spaced apart from the arm body in a first leaf direction being a direction, in which the free leaf end faces the fixed leaf end, when the link is viewed forward from a rear side of the link.

Furthermore, the center of the first link end may be disposed on an upper side of the arm body.

Furthermore, when a straight line passing through the center of the first link end and a center of the second link end is a reference line and a center of the link body with respect to a direction, in which the link body extends, is a body center, the link body may have a shape, in which the body center is located on a side being closer to the first leaf direction than the reference line.

Furthermore, when an opposite direction to the first leaf direction is a second leaf direction, a side of the link body in the second leaf direction may include a recessed area having a shape being recessed in the first leaf direction with respect to the first link end and the second link end.

Furthermore, an end of the recessed area in the first leaf direction may be located on a side being closer to the first leaf direction than the reference line.

Furthermore, the link may have a shape passing through the body center and being symmetrical with respect to a reference plane being perpendicular to the reference line.

Furthermore, the suspension may further include a first ball joint assembly inserted to pass through the first link end, and connecting the first link end and the arm body, a second ball joint assembly inserted to pass through the second link end, and connecting the second link end and the free leaf end, a first shaft fixed to a portion of the first ball joint assembly and the arm body, and a second shaft fixed to a portion of the second ball joint assembly and the free leaf end, the first link end may be rotated about a first rotation axis defined by the first shaft, with respect to the arm, and the second link end may be rotated about a second rotation axis defined by the second shaft, with respect to the free leaf end.

Furthermore, the first ball joint assembly may include a first ball joint, to which the first shaft is fixed, and a first bushing that is rotatable about a first joint rotation center being a rotation center corresponding to a center of the first ball joint, and connected to the first link end, wherein the second ball joint assembly may include a second ball joint, to which the second shaft is fixed, and a second bushing that is rotatable about a second joint rotation center being a rotation center corresponding to a center of the second ball joint, and connected to the second link end, the first joint rotation center may cross the first rotation axis, and the second joint rotation center may cross the second rotation axis.

Furthermore, the first joint rotation center and the center of the first link end may correspond to each other, and the second joint rotation center and the center of the second link end may correspond to each other.

According to another aspect of the present disclosure, a vehicle includes a vehicle body, and a suspension for the vehicle mounted on a lower portion of the vehicle body, the suspension for the vehicle includes an arm that is revolved about an arm rotation axis, and including an arm body extending in a forward/rearward direction, a transverse leaf spring including a fixed leaf end, of which a relative position to the arm rotation axis is fixed, and a free leaf end that is moved in a direction crossing the arm rotation axis with respect to the fixed leaf end, and a link connecting the arm and the transverse leaf spring, the link includes a first link end connected to the arm to be rotatable, a second link end connected to the free leaf end to be rotatable, and a link body extending between the first link end and the second link end, when one side of the link in an upward/downward direction is viewed in a direction being parallel to the upward/downward direction, a center of the first link end is located in the arm body, and the link body is spaced apart from the arm body in a first leaf direction being a direction, in which the free leaf end faces the fixed leaf end, when the link is viewed forward from a rear side of the link.

Furthermore, the suspension for the vehicle may be provided on each of one side and an opposite side of the vehicle in a widthwise direction to have a shape being symmetrical with respect to a vehicle reference plane passing through a center of the vehicle and being perpendicular to the widthwise direction of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
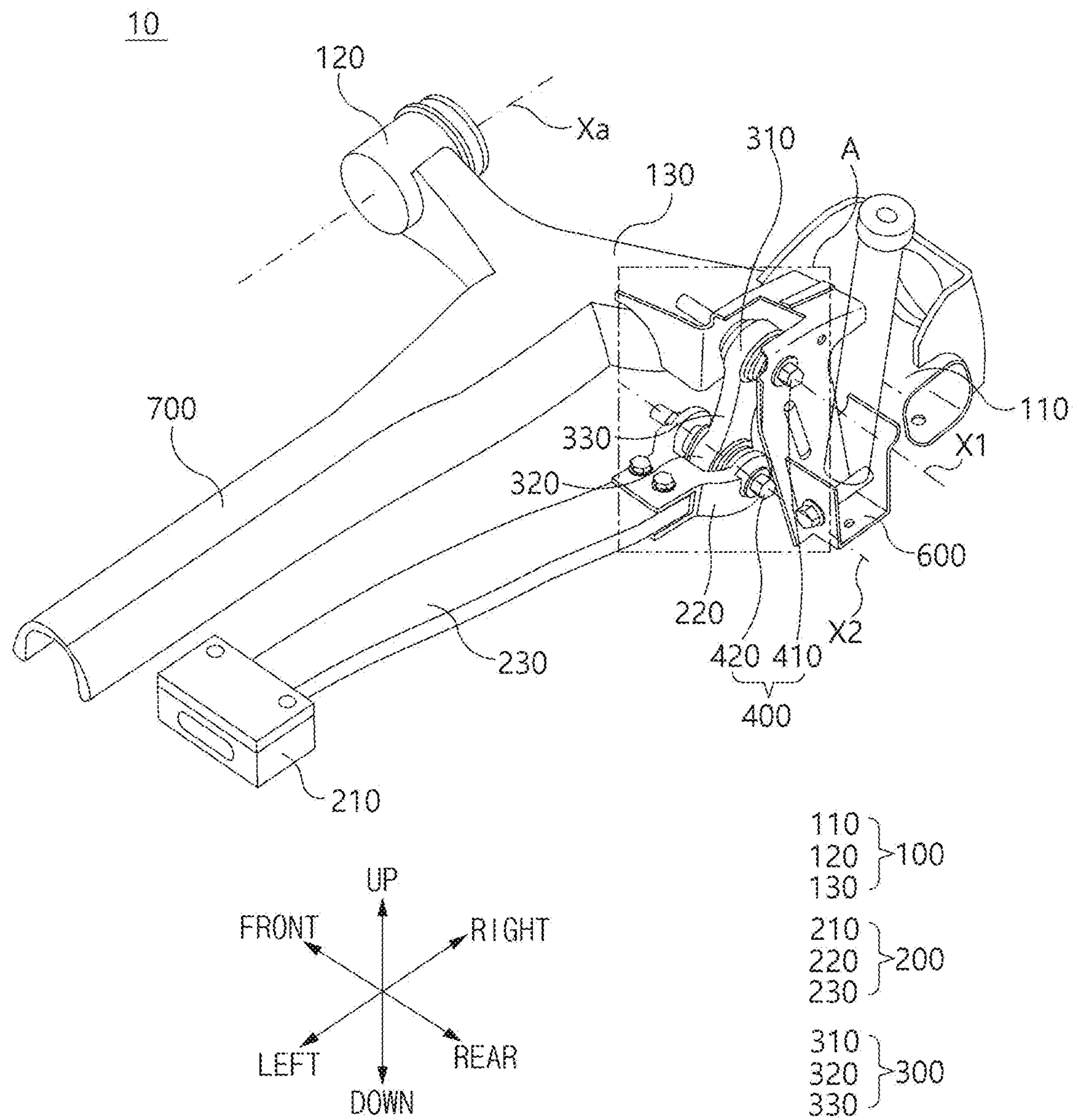
FIG. 1 is a perspective view showing an example of a suspension for a vehicle.

Hereinafter, one or more example implementations of the present disclosure will be described in detail with reference to the accompanying drawings. In adding reference numerals to the components of the drawings, it is noted that the same components are denoted by the same reference numerals even when they are drawn in different drawings.

Hereinafter, a vehicle according to the present disclosure will be described with reference to the drawings.

As an example, a vehicle according to the present disclosure may include a purpose built vehicle (PBV). An interior space of the vehicle may be utilized in various ways. As an example, the vehicle may be used as a rest area for a user, a mobile warehouse, or a mobility for delivering goods. Such a vehicle may include a suspension for a vehicle, a vehicle body, and an axle.

Figure 2:
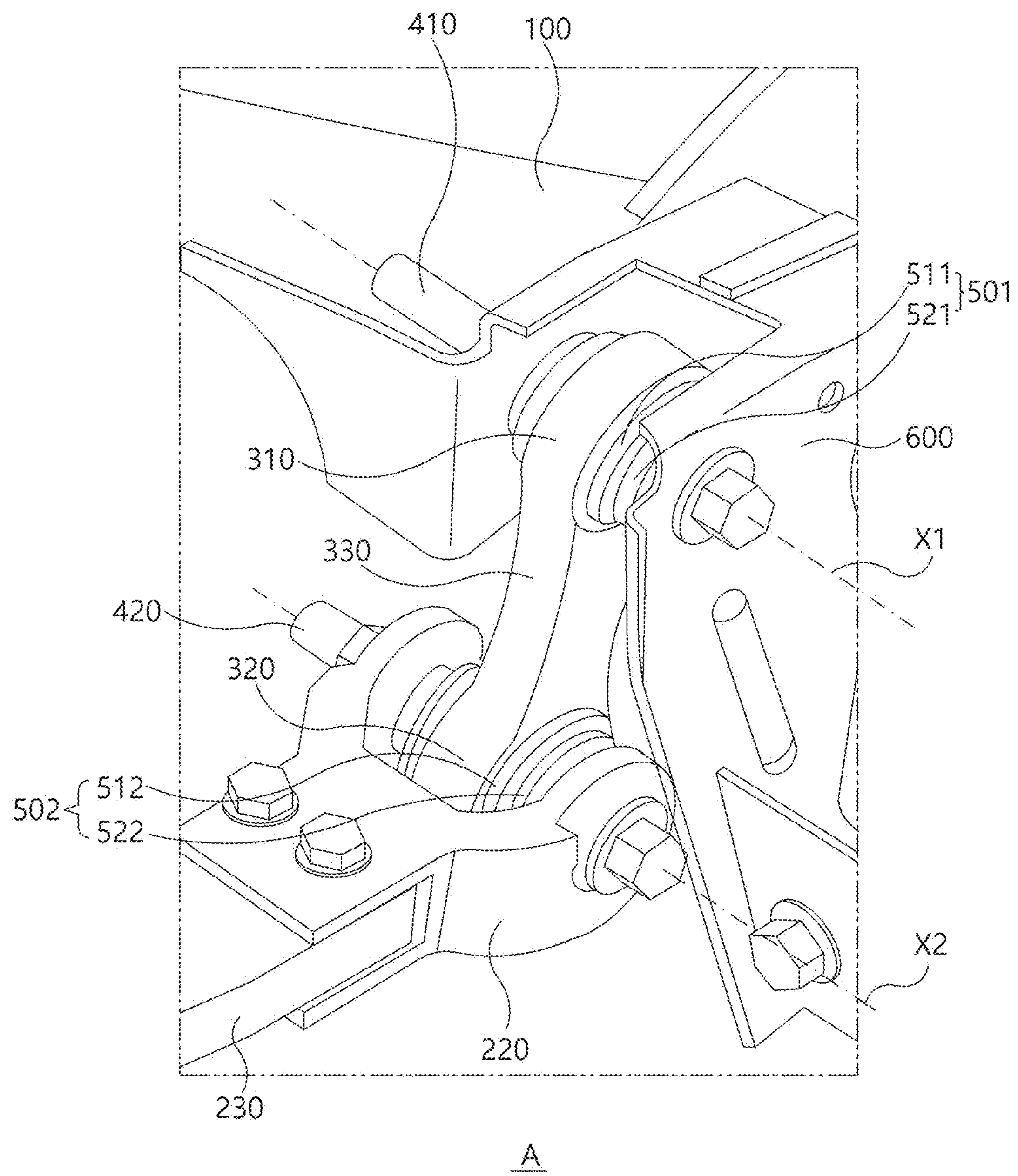
FIG. 2 is an enlarged view of portion "A" illustrated in FIG. 1.

FIG. 1 is a perspective view of a suspension for a vehicle, and FIG. 2 is an enlarged view of portion "A" illustrated in FIG. 1.

Referring to FIGS. 1 and 2, in some implementations, a suspension 10 for a vehicle may perform an impact absorbing operation on front wheels or rear wheels of the vehicle. For example, the suspension 10 for a vehicle according to the present disclosure may perform an impact absorbing operation on the rear wheels of the vehicle. Some portions of the suspension 10 for a vehicle may be connected to a lower portion of the vehicle body, and other portions may be connected to the rear wheels of the vehicle. The suspension 10 for a vehicle may include an arm 100, a transverse leaf spring 200, a link 300, a shaft 400, a first ball joint assembly 501, and a second ball joint assembly 502, a fixed frame 600, and a torsion beam 700.

The arm 100 may connect a vehicle body and an axle. The axle may refer to an area, on which the wheels of the vehicle are mounted. As an example, the arm 100 may be provided as a trailing arm, a semi-trailing arm, and the like. The arms 100 are provided on left and right sides of the vehicle, respectively, and may be disposed to be symmetrical to each other. The arms 100 may include a first arm end 110, a second arm end 120, and an arm body 130.

The first arm end 110 may be revolved about an arm rotation axis Xa. The arm rotation axis Xa may be defined as an imaginary line that passes through a center of the second arm end 120 and extends in a leftward/rightward direction. The expression that the first arm end 110 is revolved about the arm rotation axis Xa may mean that a center of the first arm end 110 is revolved around the arm rotation axis Xa while the center of the first arm end 110 is spaced apart from the arm rotation axis Xa. The first arm end 110 may define a rear end of the arm 100.

The second arm end 120 may define the arm rotation axis Xa. The second arm end 120 may be connected to the vehicle body to be rotatable. The second arm end 120 may define a front end of the arm 100.

The arm body 130 may extend between the first arm end 110 and the second arm end 120. As an example, the arm body 130, the first arm end 110, and the second arm end 120 may be integrally formed.

The transverse leaf spring 200 may absorb vibration between the vehicle body and the axle. The transverse leaf spring 200 may be elastically bent in correspondence to a movement of the axle in the upward/downward direction with respect to the vehicle body. The transverse leaf springs 200 may be provided on the left side and the right side of the vehicle, respectively, and may be disposed symmetrically to each other. The transverse leaf spring 200 may include a fixed leaf end 210, a free leaf end 220, and a transverse leaf spring 230.

The fixed leaf end 210 may be fixed to a lower portion of the vehicle body. A relative position of the fixed leaf end 210 to the arm rotation axis Xa may be fixed. The fixed leaf end 210 may connect the transverse leaf spring 230 and the vehicle body.

The fixed leaf end 210 and the free leaf end 220 may be spaced apart from each other in the leftward/rightward directions. Furthermore, among the directions that are parallel to the leftward/rightward direction, a direction, in which the fixed leaf end 210 faces the free leaf end 220, may be defined as a first leftward/rightward direction, and an opposite direction to the first leftward/rightward direction may be defined as a second leftward/rightward direction. For example, with respect to the transverse leaf spring 200 provided on the right side of the vehicle, the first leftward/rightward direction may be a rightward direction, and the second leftward/rightward direction may be a leftward direction.

An upper end of the fixed leaf end 210 may be disposed on an upper side of the free leaf end 220. In this way, because the free leaf end 220 is located on a lower side of the upper end of the fixed leaf end 210, the vehicle may be designed such that the use of space around the axle may be maximized, and at the same time, a height of the floor of the vehicle body may be lowered to a location around the upper end of the fixed leaf end 210.

The free leaf end 220 may be configured to be moved in a direction (e.g., the upward/downward direction) that crosses the arm rotation axis Xa with respect to the fixed leaf end 210. The free leaf end 220 may connect the transverse leaf spring 230 and the link 300.

The transverse leaf spring 230 may extend between the fixed leaf end 210 and the free leaf end 220. The transverse leaf spring 230 may be an elastic member that has a plane shape that extends in leftward/rightward direction.

The transverse leaf spring 230 may receive an elastic force through revolution of the first arm end 110. The free leaf end 220 may be moved in the upward/downward direction with respect to the fixed leaf end 210 by the elastic force applied to the transverse leaf spring 230.

The free leaf end 220 may be connected to a side of the of the transverse leaf spring 230 in the first leftward/rightward direction. Furthermore, the fixed leaf end 210 may be connected to a side of the transverse leaf spring 230 in the second leftward/rightward direction.

Referring back to FIG. 2, the link 300 may connect the arm 100 and the transverse leaf spring 200. In more detail, the link 300 may connect the fixed frame 600 and the free leaf end 220. The link 300 may be connected to the arm 100 to be rotatable. For example, the link 300 may be directly connected to the arm 100, or may be indirectly connected to the arm 100 by another component (e.g., a damper, a carrier, a fixed frame 600, and the like).

A center of the link 300 may be disposed on an upper side of the free leaf end 220. The link 300 may include a first link end 310, a second link end 320, and a link body 330.

The first link end 310 may define one end of the link 300. The first link end 310 may be rotated with respect to the first arm end 110. The first link end 310 may be connected to the fixed frame 600 to be rotatable about a first rotation axis X1. The first rotation axis X1 may be defined by a first shaft 410 that will be described later.

The first link end 310 may be disposed on an upper side of the second link end 320. Furthermore, the first link end 310 may be disposed on an upper side of the free leaf end 220.

The second link end 320 may define an opposite end of the link 300. The second link end 320 may be rotated with respect to the free leaf end 220. The second link end 320 may be connected to the free leaf end 220 to be rotatable about a second rotation axis X2. The second rotation axis X2 may be defined by a second shaft 420 that will be described later.

A direction, in which any one of the first rotation axis X1 and the second rotation axis X2 extends, may vary to be parallel to or cross a direction, in which the other rotation axis extends. For example, the second rotation axis X2 may extend along a forward/rearward direction. Furthermore, a relative position of the second rotation axis X2 to the arm rotation axis Xa may be fixed.

In this case, a relative position of the first rotation axis X1 to the second rotation axis X2 and the arm rotation axis Xa may be changed. For example, the first rotation axis X1 extends in a direction that is parallel to the forward/rearward direction to be parallel to the second rotation axis X2, or may extend in in a direction to cross the forward/rearward direction to cross the second rotation axis X2. In other words, the second rotation axis X2 may be a non-variable rotation axis that extends in one predetermined direction, and the first rotation axis X1 may be a variable rotation axis, of which a direction oriented depending on an operation of the arm 100 is changed.

The link body 330 may connect the first link end 310 and the second link end 320. The link body 330 may extend between the first link end 310 and the second link end 320 along a direction, in which the first link end 310 and the second link end 320 face each other. As an example, the link body 330 may be integrally formed with the first link end 310 and the second link end 320.

In some implementations, the arm, the transverse leaf spring, and the link may be configured differently from the arm 100, the transverse leaf spring 200, the and link 300.

In some implementations, the first link end may be disposed on a lower side of the second link end. For example, the second link end may be disposed on a lower side of the free leaf end. Accordingly, an upper end of the free leaf end may be disposed on an upper side of the fixed leaf end.

In summary, the arm, the transverse leaf spring, the first link end, and the second link end may be configured to correspond to shapes that are obtained by vertically reversing the arm 100, the transverse leaf spring 200, the first link end 310, and the second link end 320.

Figure 4:
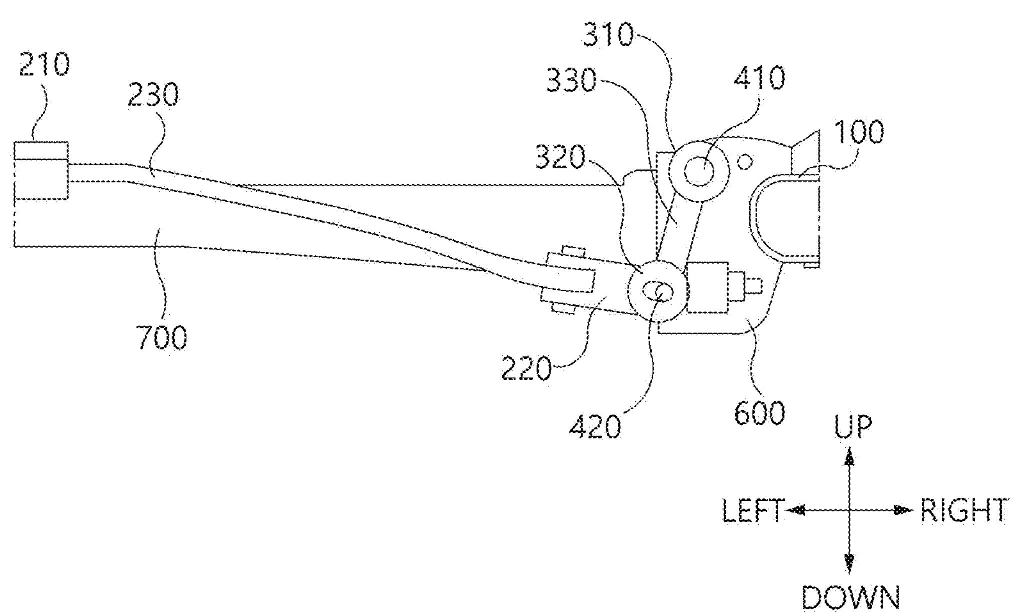
FIG. 4 is a rear view showing an example of a suspension for a vehicle.

For example, the shape of the suspension may correspond to the vertically reversed shape of the suspension 10 illustrated in FIG. 4.

Again, the shaft 400 may include a first shaft 410 and a second shaft 420. The first shaft 410 may define the first rotation axis X1. The first shaft 410 may be inserted through the first link end 310.

Furthermore, the first shaft 410 may be fixed to the fixed frame 600. For example, the first shaft 410 may be inserted through and fixed to the fixed frame 600. However, the present disclosure is not limited to the example, and the first shaft 410 may not be inserted through the fixed frame 600 but may be connected to and fixed to opposite sides of the fixed frame 600. The first shaft 410 may be fixed to the fixed frame 600 and may be configured to move together with the fixed frame 600. In other words, a direction, in which the first rotation axis X1 is oriented, may be changed by the movement of the first shaft 410, and the first shaft 410 may be moved to correspond to the movement of the fixed frame 600. The fixed frame 600 may be fixed to the arm 100, and may be moved to correspond to the movement of the arm 100. Accordingly, the first shaft 410 may be rotated about the arm rotation axis Xa.

The second shaft 420 may form the second rotation axis X2. The second shaft 420 may be inserted through the second link end 320. Furthermore, the second shaft 420 may be fixed to the free leaf end 220. For example, the second shaft 420 may be inserted through and fixed to the free leaf end 220. However, the present disclosure is not limited to the example, and the second shaft 420 may not be inserted through the free leaf end 220, and may be connected to and fixed to opposite sides of the free leaf end 220. The second shaft 420 may be fixed to the free leaf end 220, and may be configured to be moved together with the free leaf end 220. In other words, a direction, in which the second rotation axis X2 is oriented, may be determined by the movement of the second shaft 420, and the second shaft 420 may be moved to correspond to the movement of the free leaf end 220.

The first ball joint assembly 501 may connect the fixed frame 600 and the first link end 310. The first ball joint assembly 501 may be inserted through the first link end 310. The first ball joint assembly 501 may include a first bushing 511 and a first ball joint 521.

The first bushing 511 may connect the first ball joint 521 and the first link end 310. The first bushing 511 may be configured to be rotatable about a first joint rotation center that is a rotation center corresponding to a center of the first ball joint 521. The first bushing 511 may be connected to an outer peripheral surface of a central portion of the first ball joint 521 to be rotatable with respect to the first joint rotation center such that a central portion of the first ball joint 521 is seated on an inner peripheral surface of the first bushing 511. The first joint rotation center may cross the first rotation axis X1. The first joint rotation center may correspond to a center of the first link end 310.

An outer peripheral surface of the first bushing 511 may be fixed to the first link end 310. Accordingly, the first bushing 511 may be configured to be moved together with the first link end 310 while being fixed to the first link end 310. In other words, because the first link end 310 is moved to correspond to the movement of the first bushing 511, the first link end 310 may be rotated about the first rotation axis X1 and may be moved to be inclined in a direction that is different from the first rotation axis X1 with respect to the joint rotation center as well. In other words, the first link end 310, the second link end 320, and the link body 330, which are integrally formed, may be moved to be inclined in a direction that is skewed with the first rotation axis X1 with respect to the first joint rotation center.

The first shaft 410 may be fixed to the first ball joint 521. For example, the first shaft 410 may be inserted through and fixed to the first ball joint 521. However, the present disclosure is not limited to the example, and the first shaft 410 may not be inserted through the first ball joint 521, but may be connected to and fixed to opposite sides of the first ball joint 521.

An outer peripheral surface of a central portion of the first ball joint 521 may have a ball shape, and an outer peripheral surface of a peripheral portion of the first ball joint 521 may have a cylindrical shape. The central portion of the first ball joint 521 may be named a first pillow ball. A through-hole, through which the first shaft 410 may pass, may be formed in an interior of the first ball joint 521, and an inner peripheral surface of the first ball joint 521 that surrounds the through-hole, may be attached to the outer peripheral surface of the first shaft 410.

The second ball joint assembly 502 may connect the free leaf end 220 and the second link end 320. The second ball joint assembly 502 may be inserted through the second link end 320. The second ball joint assembly 502 may include a second bushing 512 and a second ball joint 522.

The second bushing 512 may connect the second ball joint 522 and the second link end 320. The second bushing 512 may be rotatable about a second joint rotation center that is a rotation center corresponding to the center of the second ball joint 522. For example, the second bushing 512 may be connected to an outer peripheral surface of a central portion of the second ball joint 522 to be rotatable about the second joint rotation center such that the central portion of the second ball joint 522 is seated on the inner peripheral surface of the second bushing 512. The second joint rotation center may cross the second rotation axis X2. The second joint rotation center may correspond to the center of the second link end 320.

The outer peripheral surface of the second bushing 512 may be fixed to the second link end 320. Accordingly, the second bushing 512 may be configured to be moved together with the second link end 320 while being fixed to the second link end 320. In other words, because the second link end 320 is moved to correspond to the movement of the second bushing 512, the second link end 320 is rotated about the second rotation axis X2 and may be moved to be inclined in a direction that is different from the second rotation axis X2 with respect to the joint rotation center as well. In other words, the first link end 310, the second link end 320, and the link body 330 that are integrally formed may be moved to be inclined in a direction that is skewed with the second rotation axis X2 with respect to the second joint rotation center.

The second shaft 420 may be fixed to the second ball joint 522. For example, the second shaft 420 may be inserted through and fixed to the second ball joint 522. However, the present disclosure is not limited to the example, and the second shaft 420 may not be inserted through the second ball joint 522, and may be connected to and fixed to opposite sides of the second ball joint 522.

An outer peripheral surface of a central portion of the second ball joint 522 may have a ball shape, and an outer peripheral surface of a peripheral portion of the second ball joint 522 may have a cylindrical shape. The central portion of the second ball joint 522 may be named a second pillow ball. A through-hole, through which the second shaft 420 may pass, may be formed in an interior of the second ball joint 522, and the inner peripheral surface of the second ball joint 522 that surrounds the through-hole may be attached to the outer peripheral surface of the second ball joint 522.

The fixed frame 600 may be fixed to the arm 100. The fixed frame 600 may be connected to on a side of the first arm end 110 in the second leftward/rightward direction. The fixed frame 600 may connect the first arm end 110 and the first link end 310. The fixed frame 600 may space the link 300 and the first arm end 110 apart from each other along the leftward/rightward direction. Through the fixed frame 600, the link 300 may be prevented from interfering with the arm 100 while being moved.

The torsion beam 700 may have a shape of a beam that extends from the center of the arm body 130 in the leftward/rightward direction. The torsion beam 700 may be a member that applies a torsional elastic force for restoring an original shape thereof when being twisted around a torsion axis that passes through the torsion beam 700 and extends in the leftward/rightward direction. The torsion beam 700 may be located between the first arm end 110 and the second arm end 120 with respect to the forward/rearward direction.

Hereinafter, states of the link 300 that is changed while the suspension 10 for a vehicle is operated will be described in detail with further reference to FIGS. 3 to 6.

Figure 3:
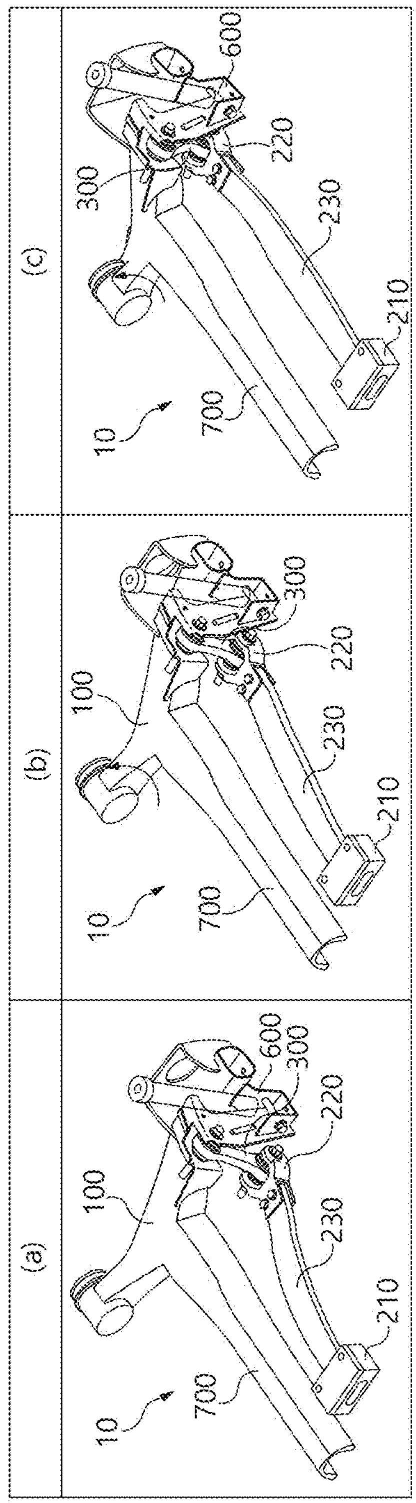
FIG. 3 is a view illustrating separate perspective views of a suspension for a vehicle in three different states, respectively.
Figure 5:
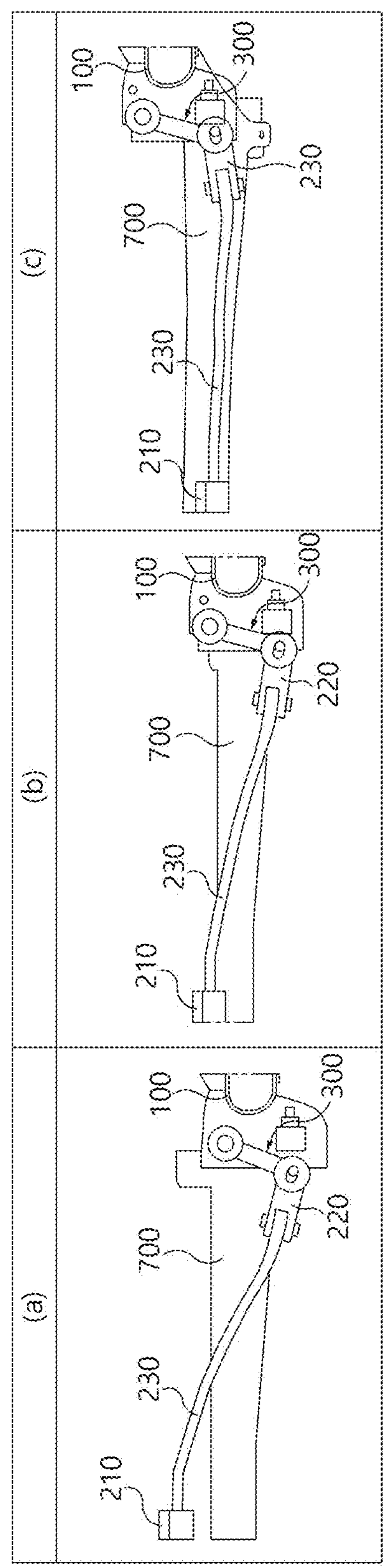
FIG. 5 is a view illustrating separate rear views of a suspension for a vehicle in three different states, respectively.
Figure 6:
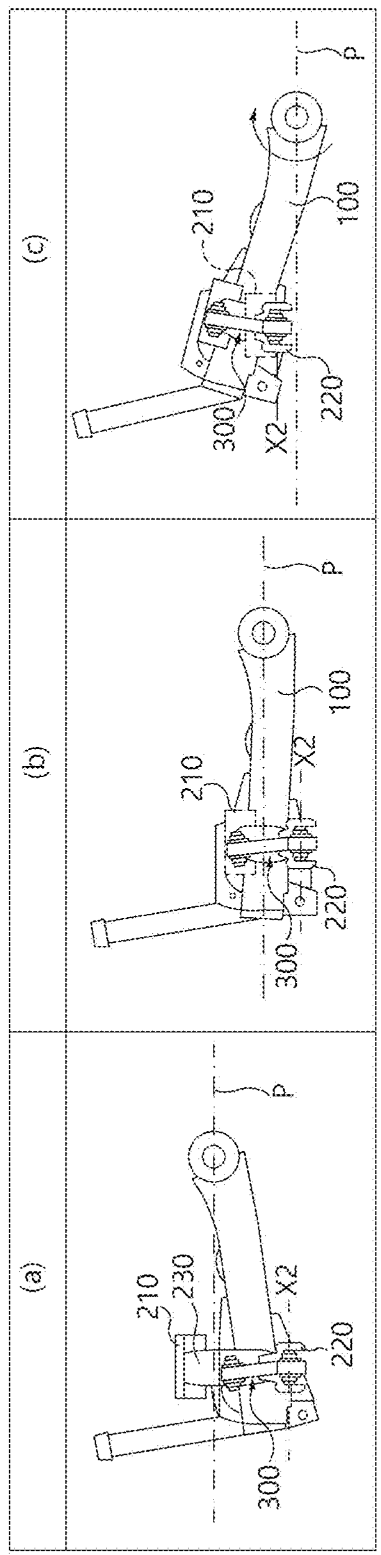
FIG. 6 is a view illustrating separate side views of a suspension for a vehicle in three different states, respectively.

FIG. 3 is a view illustrating separate perspective views of the suspension for a vehicle in three different states, respectively, FIG. 4 is a rear view of the suspension for a vehicle, FIG. 5 is a view illustrating separate rear views of the suspension for a vehicle in three different states, respectively, and FIG. 6 is a view illustrating separate side views of the suspension for a vehicle in three different states, respectively.

The link 300 may be in any one of a rebound state, a tolerance state, and a bump state. FIG. 3A, FIG. 5A, and FIG. 6A are views illustrating states of the link 300 in the rebound state.

Referring to FIG. 6A, when the link 300 is in the rebound state, the link body 330 (see FIG. 1) may be located to be spaced downward apart from a reference plane "P" to be most distant therefrom. The reference plane "P" may refer to a plane that passes through the arm rotation axis Xa and is perpendicular to the upward/downward direction. When The link 300 is in the rebound state, the axle may be positioned in a state, in which it is moved most downward with respect to the vehicle body. When the link 300 is in the rebound state, the link body 330 may be oriented to be inclined with respect to the upward/downward direction such that an upper portion thereof is located on a rear side of a lower portion thereof.

FIG. 3B, FIG. 4, FIG. 5B, and FIG. 6B are views illustrating states of the link 300 in the tolerance state. The link 300 in the tolerance state may refer to a state of the link 300 when a vehicle without any driver or luggage is located on a flat ground without an inclination.

Referring to FIG. 6B, when the link 300 is positioned in the tolerance state, the link body 330 may be located to cross the reference plane "P". When the first arm end 110 is revolved forward and downward about the arm rotation axis Xa from when the link 300 is in the tolerance state, the link 300 may be switched from the tolerance state to the rebound state.

FIG. 3C, FIG. 5C, and FIG. 6C are views illustrating states of the link 300 in the bumped state. Referring to FIG. 6C, when the link 300 is positioned in the bump state, the link body 330 may be located to be spaced upward apart from the reference plane "P" to be most distant therefrom. When the link 300 is in the bump state, the axle may be positioned in a state, in which it is moved most upward with respect to the vehicle body.

Furthermore, when the first arm end 110 is revolved forward and upward about the arm rotation axis Xa from when the link 300 is in the tolerance state, the link 300 may be switched from the tolerance state to the bump state. When the link 300 is positioned in the bump state, the link body 330 may be oriented to be inclined with respect to the upward/downward direction such that an upper portion thereof is located on a front side of a lower portion thereof.

When the link 300 is switched from any one of the tolerance state, the rebound state, and the bump state to another one, an angle formed by the first rotation axis X1 and the second rotation axis X2 may be changed. For example, when the link 300 switches from any one of the tolerance state, rebound state, and bump state to another one, a direction, in which the second rotation axis X2 extends, may be parallel to one predetermined direction, and an orientation direction of the first rotation axis X1 may be changed depending on a change in the state of the link 300.

According to the suspension 10 for a vehicle, through the link 300, the first ball joint assembly 501 and the second ball joint assembly 502, a difference value between an arm path that is a path, in which the first arm end 110 is rotated about the arm rotation axis Xa, and a spring path that is a path, in which the free leaf end 220 is moved with respect to the fixed leaf end 210, may be compensated for. In other words, even when the arm path and spring path are configured differently, through the link 300, the first ball joint assembly 501, and the second ball joint assembly 502, a decrease in a durability of the suspension 10 for a vehicle due to a relative movement of the first arm end 110 and the free leaf end 220 may be effectively prevented.

Hereinafter, an example of a suspension 10 for a vehicle will be described with reference to FIGS. 7 to 10. In a description of the suspension 10 for a vehicle, differences from the implementations described above will be mainly described.

Figure 7:
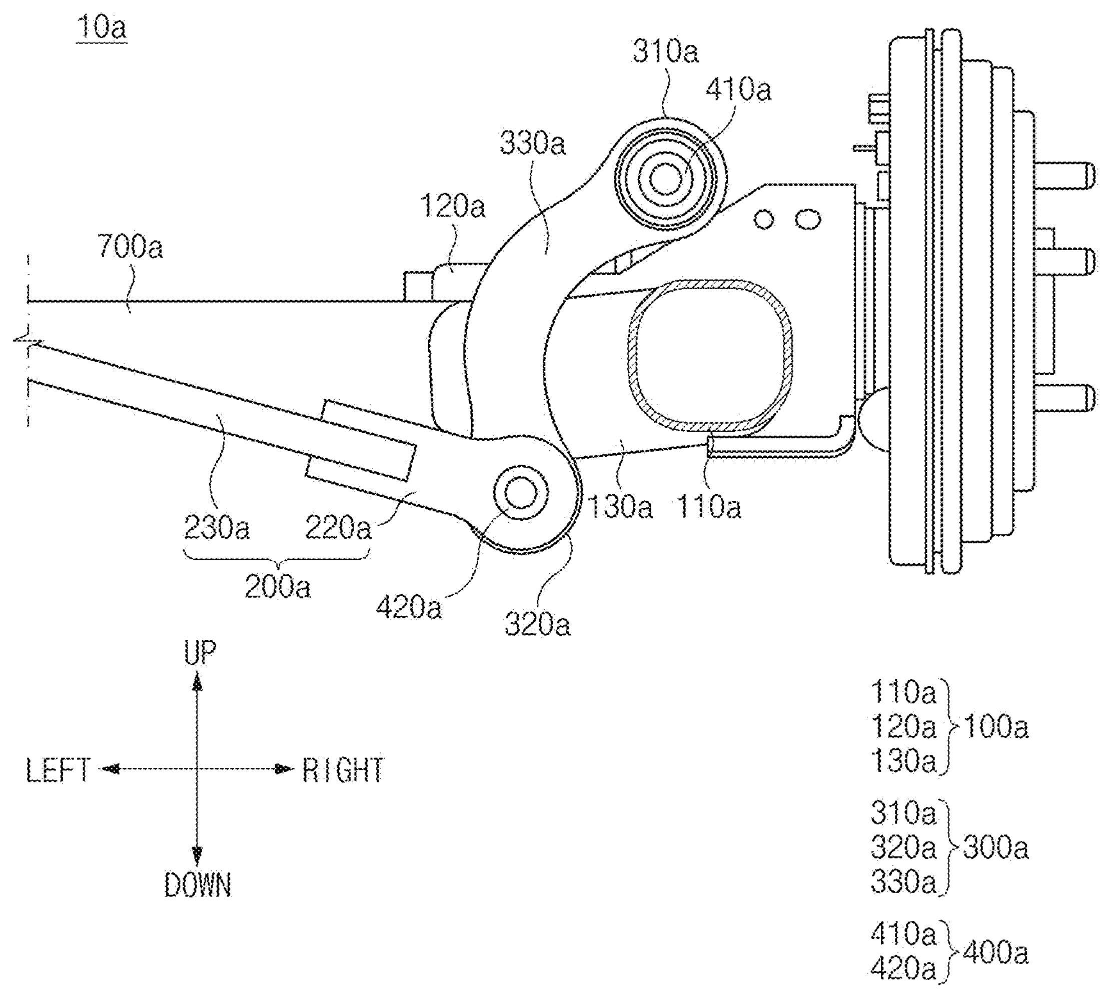
FIG. 7 is a rear view showing an example of a suspension for a vehicle.
Figure 8:
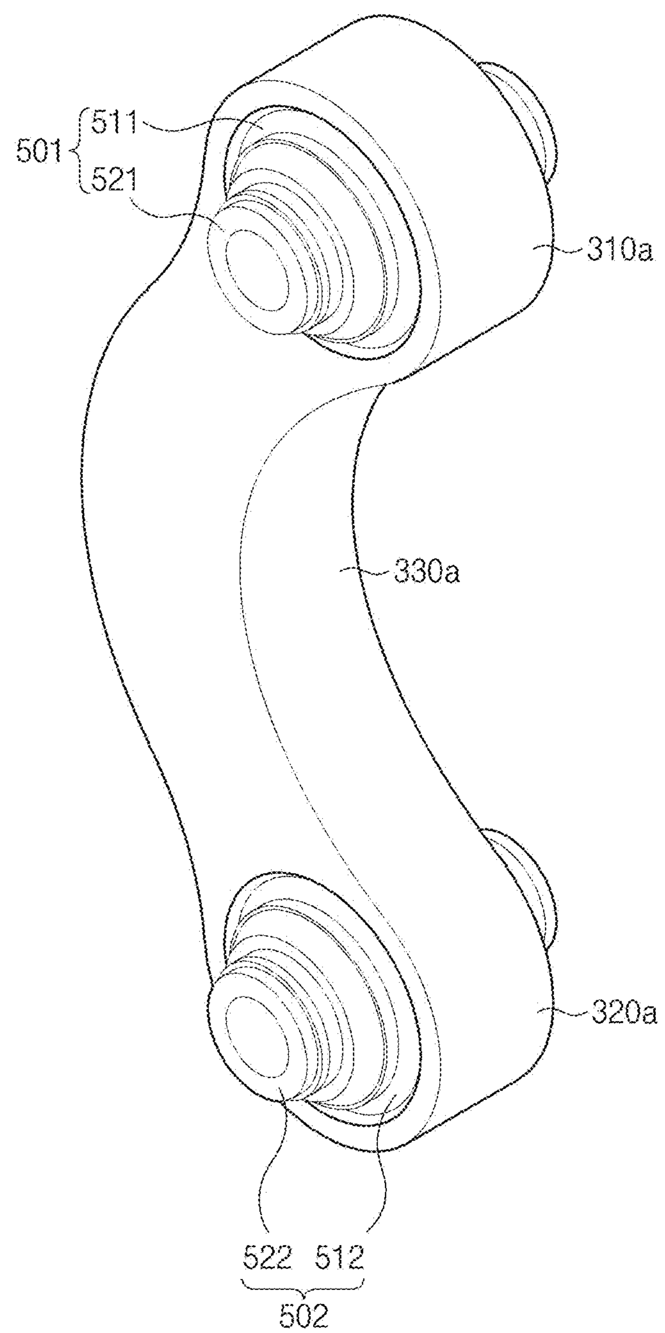
FIG. 8 is a view illustrating an example of a first ball joint assembly and a second ball joint assembly that are connected to a link.
Figure 9:
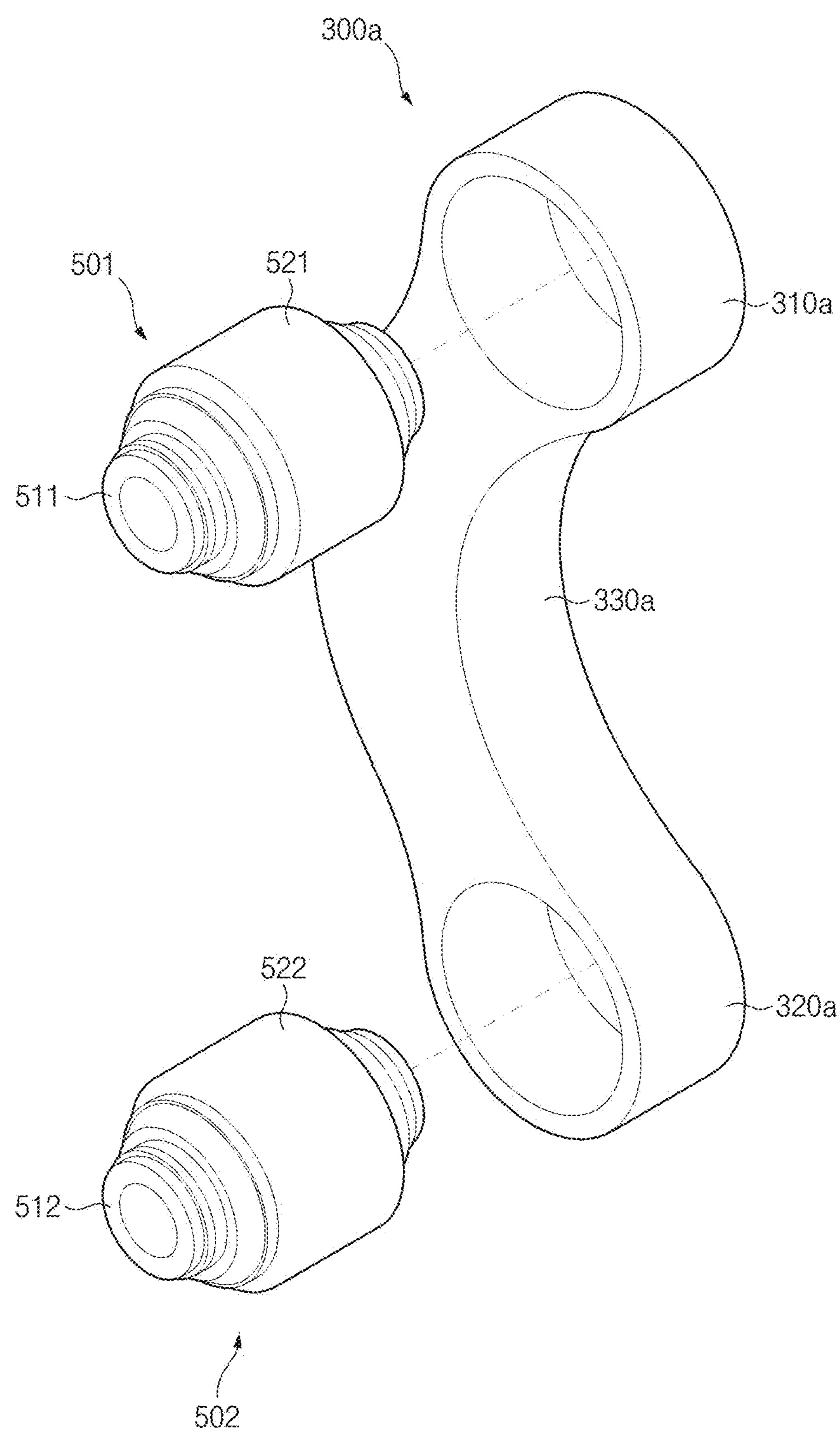
FIG. 9 is a view illustrating an example state in which the first ball joint assembly and the second ball joint assembly are separated from the link.
Figure 10:
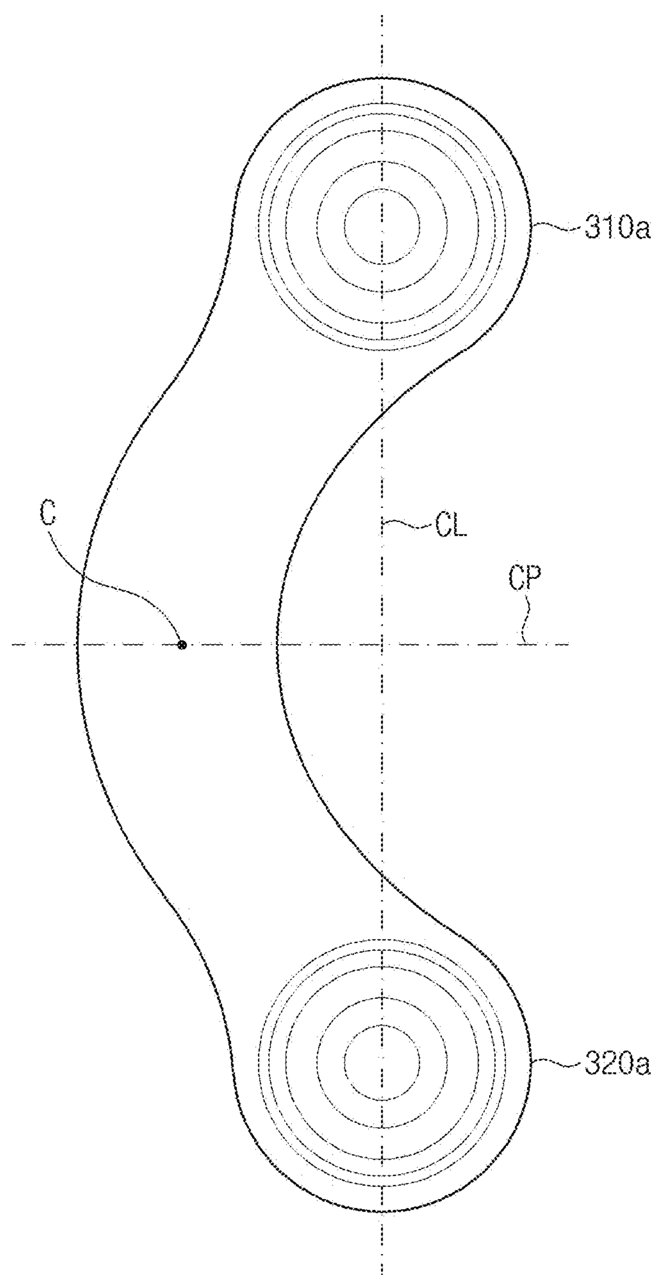
FIG. 10 is a rear view of the link, the first ball joint assembly, and the second ball joint assembly.

FIG. 7 is a rear view of a suspension for a vehicle, FIG. 8 is a view illustrating a state, in which a first ball joint assembly and a second ball joint assembly are connected to a link, FIG. 9 is a view illustrating a state, in which the first ball joint assembly and the second ball joint assembly are separated from the link, and FIG. 10 is a rear view of the link, the first ball joint assembly, and the second ball joint assembly.

Referring to FIG. 7, the suspension 10 for a vehicle may include an arm 100*a*, a transverse leaf spring 200*a*, a link 300*a*, a shaft 400*a*, and a first ball joint assembly 501, a second ball joint assembly 502, a fixed frame, and a torsion beam 700*a*.

The arm 100*a* may include a first arm end 110*a*, a second arm end 120, and an arm body 130. For a description of the arm 100*a*, the first arm end 110*a*, and a second arm end 120*a*, the description of the arm 100, the first arm end 110, and the second arm end 120 will be used.

An arm body 130*a* may extend between the first arm end 110*a* and the second arm end 120*a* along the forward/rearward direction. The arm body 130*a* may be configured to be revolved about the arm rotation axis Xa. For example, the arm body 130*a* and the first arm end 110*a* may be configured to be revolved together about the arm rotation axis Xa.

The transverse leaf spring 200*a* may include a fixed leaf end, a free leaf end 220*a*, and a transverse leaf spring 230*a*. For a description of the transverse leaf spring 200*a*, the fixed leaf end, the free leaf end 220*a*, and the transverse leaf spring 230*a*, the descriptions of the transverse leaf spring 200, the fixed leaf end 210, the free leaf end 220, and the transverse leaf spring 230 will be used.

Referring to FIGS. 8 and 9, the link 300*a* may include a first link end 310*a*, a second link end 320*a*, and a link body 330*a*. The first link end 310*a* may be connected to the arm 100*a* to be rotatable. For example, the first link end 310*a* and the arm 100*a* may be connected to each other by a fixed frame.

The first link end 310*a* may be disposed on an upper side of the arm 100*a*. A center of the first link end 310*a* may be located inside the arm body 130*a* when the link 300*a* is viewed downward from an upper side of the link 300*a*. For example, when the first link end 310*a* and the arm body 130*a* are projected with respect to each other along the upward/downward direction, the center of the first link end 310*a* may overlap a portion of the arm body 130*a*. In other words, at least a portion of the first link end 310*a* and at least a portion of the arm body 130*a* may be disposed to face each other in the upward/downward direction.

The link body 330*a* may be disposed to be spaced apart from the arm body 130*a*. For example, when the link 300*a* is viewed forward from a rear side of the link 300*a*, the link body 330*a* may be spaced apart from the arm body 130*a* in a direction, in which the free leaf end 220*a* faces the fixed leaf end in the first leaf direction. In this way, because the link body 330*a* is disposed to be spaced apart from the arm body 130*a*, the link 300*a* may be prevented from interfering with the arm body 130*a* while the arm 100*a* is moved.

Referring to FIG. 10, a straight line that passes through a center of the first link end 310*a* and a center of the second link end 320*a* may be named a reference line CL. Furthermore, a center of the link body may be named a body center "C" with respect to a direction, in which the link body extends.

The link body 330*a* may have a shape, in which the body center "C" is located on a side of the first leaf direction in the reference line. In other words, the link body 330*a* may have a shape that is disposed to be biased toward the first leaf direction with respect to the first link end 310*a* and the second link end 320*a*. a side of the link body 330*a* in the second leaf direction (an opposite direction to the first leaf direction) may include a recessed area.

The recessed area may have a shape that is recessed in the first leaf direction with respect to the first link end 310*a* and the second link end 320*a*. For example, the recessed area may have a shape that is concavely curved in the first leaf direction. An end of the recessed area in the first leaf direction side may be located on a side of the reference line CL in the first leaf direction. In other words, the end of the recessed area in the first leaf direction may be spaced apart from the reference line CL in a direction that is parallel to the first leaf direction.

Furthermore, the link 300 may have a shape that passes through the body center "C" and is symmetrical with respect to a link reference plane CP that is perpendicular to the reference line CL. Furthermore, the link 300 may have a shape that passes through the body center "C" and is symmetrical with respect to an imaginary plane that is perpendicular to the forward/rearward directions.

Through the shape of the link 300*a* as described above, even when the first link end 310*a* is disposed adjacent to an upper portion of the arm body 130*a*, the link 300 and the arm body 130*a* may be prevented from interfering with each other. Furthermore, because the first link end 310*a* is not spaced apart from the arm body 130*a* in the leftward/rightward direction but is disposed close to the arm body 130*a* with respect to the leftward/rightward direction, a leftward/rightward width of the interior space of the vehicle body may be maximally secured.

In some implementations, the arm, the transverse leaf spring, and the link may be configured differently from the arm 100*a*, transverse leaf spring 200*a*, and link 300*a*.

In some implementations, the first link end may be disposed on a lower side of the second link end. For example, the second link end may be disposed on a lower side of the free leaf end. Accordingly, an upper end of the free leaf end may be disposed on an upper side of the fixed leaf end.

In summary, the arm, the transverse leaf spring, the first link end, and the second link end may be configured to correspond to shapes obtained by vertically reversing the arm 100*a*, the transverse leaf spring 200*a*, and the first link end 310*a*, and the second link end 320*a*, respectively.

For example, the shape of the suspension may correspond to the vertically reversed shape of the suspension 10*a* illustrated in FIG. 7.

The shaft 400*a* may include a first shaft 410*a* and a second shaft 420*a*. The first shaft 410*a* may be fixed to the arm body 130*a*. For example, the first shaft 410*a* may be directly connected to and fixed to the arm body 130*a*. However, the present disclosure is not limited to the example, and the first shaft 410*a* may be indirectly connected to the arm body 130*a* through another structure (e.g., a damper, a carrier, and the like). The first link end 310*a* may be rotated about the first rotation axis defined by the first shaft 410*a* with respect to the arm 100*a*.

The second shaft 420*a* may be fixed to the free leaf end 220*a*. The second link end 320*a* may be rotated about the second rotation axis defined by the second shaft 420*a* with respect to the free leaf end 220.

The first ball joint assembly 501 may include a first bushing 511 and a first ball joint 521. The first bushing 511 may be configured to be rotatable about the first joint rotation center (a rotation center corresponding to the center of the first ball joint 521).

Furthermore, the first joint rotation center may correspond to the center of the first link end 310*a*. The first bushing 511 may connect the first link end 310*a* and the first ball joint 521.

Furthermore, the first shaft 410*a* may be fixed to the first ball joint 521. For example, the first shaft 410*a* may be inserted through and fixed to the first ball joint 521. However, the present disclosure is not limited to the example, and the first shaft 410*a* may not be inserted through the first ball joint 521, but may be connected to and fixed to opposite sides of the first ball joint 521.

The second ball joint assembly 502 may include a second bushing 512 and a second ball joint 522. The second bushing 512 may be configured to be rotatable about a second joint rotation center (a rotation center corresponding to the center of the second ball joint 522). Furthermore, the second joint rotation center may correspond to the center of the second link end 320*a*. The second bushing 512 may connect the second link end 320*a* and the second ball joint 522.

Furthermore, the second shaft 420*a* may be fixed to the second ball joint 522. For example, the second shaft 420*a* may be inserted through and fixed to the second ball joint 522. However, the present disclosure is not limited to the example, and the second shaft 420*a* may not be inserted through the second ball joint 522, but may be connected to and fixed to opposite sides of the second ball joint 522.

Furthermore, referring to FIG. 8, when no external force is applied to the first ball joint assembly 501 and the second ball joint assembly 502, the first ball joint assembly 501 and the second ball joint assembly 502, as an example, may be oriented in parallel to each other. However, the idea of the present disclosure is not limited to thereto, and unlike the illustration in the drawing, the first ball joint assembly 501 and the second ball joint assembly 502 may be oriented to be skewed with each other when no external force is applied to the first ball joint assembly 501 and the second ball joint assembly 502.

For a description of the torsion beam 700*a*, the description of the torsion beam 700 will be used.

According to the suspension for a vehicle according to the present disclosure, the height of the floor of the vehicle body may be prevented from being limited by the springs whereby it is possible to lower the height of the floor of the vehicle body.

In addition, the suspension for a vehicle may maximize the durability by minimizing the difference between the behavior of the arm and the behavior of the spring.

Additionally, the suspension for a vehicle may minimize noise generated during an operation thereof.

The above description is a simple exemplary description of the technical spirits of the present disclosure, and an ordinary person in the art, to which the present disclosure pertains, may make various corrections and modifications without departing from the essential characteristics of the present disclosure. Therefore, the implementations disclosed in the present disclosure are not for limiting the technical spirits of the present disclosure but for describing them, and the scope of the technical spirits of the present disclosure is not limited by the implementations. The protection scope of the present disclosure should be construed by the following claims, and all the technical spirits in the equivalent range should be construed as being included in the scope of the present disclosure.

What is claimed is:

1. A suspension for a vehicle, comprising:

an arm configured to rotate about an arm rotation axis, the arm comprising an arm body that extends in a forward/rearward direction of the vehicle;

a transverse leaf spring comprising (i) a fixed leaf end that is disposed at a fixed position relative to the arm rotation axis and (ii) a free leaf end that faces the fixed leaf end in a first direction and is configured to move relative to the fixed leaf end in a direction crossing the arm rotation axis; and a link that connects the arm to the transverse leaf spring, wherein the link comprises:

a first link end connected to the arm body and configured to rotate relative to the arm body, wherein a rotation center of the first link end is located at the arm body, a second link end connected to the free leaf end and configured to rotate relative to the arm, and a link body that extends between the first link end and the second link end, the link body being spaced apart from the arm body.

2. The suspension of claim 1, wherein the rotation center of the first link end is disposed at an upper side of the arm body.

3. The suspension of claim 1, wherein the link body has a body center that is offset toward the free leaf end relative to a reference line passing through the rotation center of the first link end and a rotation center of the second link end.

4. The suspension of claim 3, wherein the link body defines a recessed area that is recessed from a surface of the link body facing opposite to the fixed leaf end, the recessed area being recessed in the first direction relative to the first link end and the second link end.

5. The suspension of claim 4, wherein an end of the recessed area is offset toward the free leaf end in the first direction relative to the reference line.

6. The suspension of claim 3, wherein the link extends through the body center and is symmetrical with respect to a reference plane that is perpendicular to the reference line.

7. The suspension of claim 1, further comprising:

a first ball joint assembly that passes through the first link end and connects the first link end to the arm body;

a second ball joint assembly that passes through the second link end and connects the second link end to the free leaf end;

a first shaft fixed to a portion of the first ball joint assembly connected to the arm body; and a second shaft fixed to a portion of the second ball joint assembly connected to the free leaf end, wherein the first link end is configured to rotate relative to the arm about a first rotation axis defined by the first shaft, and wherein the second link end is configured to rotate relative to the free leaf end about a second rotation axis defined by the second shaft.

8. The suspension of claim 7, wherein the first ball joint assembly comprises:

a first ball joint to which the first shaft is fixed; and a first bushing connected to the first link end and configured to be rotate about a first joint rotation center axis defined by the first ball joint, the first joint rotation center axis crossing the first rotation axis, and wherein the second ball joint assembly comprises:

a second ball joint to which the second shaft is fixed, and a second bushing connected to the second link end and configured to rotate about a second joint rotation center axis defined by the second ball joint, the second joint rotation center axis crossing the second rotation axis.

9. The suspension of claim 8, wherein the first joint rotation center axis passes through the rotation center of the first link end, and wherein the second joint rotation center axis passes through the rotation center of the second link end.

10. A vehicle comprising:

a vehicle body; and a suspension disposed at a lower portion of the vehicle body, wherein the suspension comprises:

an arm configured to rotate about an arm rotation axis, the arm comprising an arm body that extends in a forward/rearward direction of the vehicle, a transverse leaf spring comprising (i) a fixed leaf end that is disposed at a fixed position relative to the arm rotation axis and (ii) a free leaf end that faces the fixed leaf end in a first direction and is configured to move relative to the fixed leaf end in a direction crossing the arm rotation axis, and a link that connects the arm to the transverse leaf spring, and wherein the link comprises:

a first link end connected to the arm body and configured to rotate relative to the arm body, wherein a rotation center of the first link end is located at the arm body, a second link end connected to the free leaf end and configured to rotate relative to the arm, and a link body that extends between the first link end and the second link end, the link body being spaced apart from the arm body.

11. The vehicle of claim 10, wherein the suspension is one of a pair of suspensions for the vehicle, wherein the pair of suspensions are disposed at a first side and a second side of the vehicle, respectively, and spaced apart from each other in a widthwise direction of the vehicle, and wherein the pair of suspensions are symmetrical with respect to a vehicle reference plane that passes through a center of the vehicle and is perpendicular to the widthwise direction of the vehicle.

* * * * *